(12) United States Patent
Gendraud et al.

(10) Patent No.: US 10,900,382 B2
(45) Date of Patent: Jan. 26, 2021

(54) ASSEMBLY COMPRISING A LOCKED SECURING STUD

(71) Applicant: SAFRAN AIRCRAFT ENGINES, Paris (FR)

(72) Inventors: Alain Dominique Gendraud, Vernou la Celle sur Seine (FR); Jean-Baptiste Vincent Desforges, Paris (FR); Arnaud Genilier, Bouray sur Juine (FR); Reda Oudyi, Lieusaint (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 424 days.

(21) Appl. No.: 15/745,788

(22) PCT Filed: Jul. 19, 2016

(86) PCT No.: PCT/FR2016/051850
§ 371 (c)(1),
(2) Date: Jan. 18, 2018

(87) PCT Pub. No.: WO2017/013349
PCT Pub. Date: Jan. 26, 2017

(65) Prior Publication Data
US 2018/0209302 A1     Jul. 26, 2018

(30) Foreign Application Priority Data
Jul. 22, 2015   (FR) ..................................... 15 56941

(51) Int. Cl.
*F01D 25/24*     (2006.01)
*F16B 39/24*     (2006.01)

(52) U.S. Cl.
CPC ............ *F01D 25/243* (2013.01); *F16B 39/24* (2013.01); *F16B 2200/506* (2018.08)

(58) Field of Classification Search
CPC .. F16B 39/108; F16B 39/24; F16B 2200/506; F01D 25/243; Y10T 403/1691; Y10T 403/589; Y10T 403/645; Y10T 403/75
USPC ................................ 403/22, 320, 337, 408.1
See application file for complete search history.

(56) References Cited

U.S. PATENT DOCUMENTS

| | | | |
|---|---|---|---|
| 2,525,217 A | 10/1950 | Glitsch | |
| 6,471,457 B2* | 10/2002 | Nago | F16B 39/108 411/121 |
| 6,641,326 B2 | 11/2003 | Schilling et al. | |
| 10,239,192 B2* | 3/2019 | Guyomard | F16B 39/108 |
| 2003/0118399 A1 | 6/2003 | Schilling et al. | |

FOREIGN PATENT DOCUMENTS

| DE | 1000642 B | * | 1/1957 | ........... F16B 39/108 |
|---|---|---|---|---|
| DE | 1 301 937 B | | 8/1969 | |
| DE | 1301937 B | * | 8/1969 | ........... F16B 39/108 |

OTHER PUBLICATIONS

International Search Report dated Nov. 17 2016, in PCT/FR2016/051850 filed Jul. 19, 2016.
French Search Report dated May 25, 2016 in French Application 1556941 filed Jul. 22, 2015.

* cited by examiner

*Primary Examiner* — Josh Skroupa
(74) *Attorney, Agent, or Firm* — Oblon, McClelland, Maier & Neustadt, L.L.P.

(57) ABSTRACT

An assembly includes a securing stud held by a locking key that rotates with the stud and is provided with bearing surfaces for sitting on an edge of one of the parts to be assembled.

5 Claims, 2 Drawing Sheets

ASSEMBLY COMPRISING A LOCKED SECURING STUD

The subject matter of the invention is an assembly comprising a locked securing stud.

Such an arrangement can be applied to the securement of two circular cases of turbines, provided with planar circular flanges which are adjoined to each other. The studs pass through bores of these flanges and are screwed in a captive nut, integrated to one of the flanges, through one end. Their opposite end receives a tightening nut by virtue of which the flanges are held tightened to each other.

Such assemblies have to be held with a sufficient tightening force to guard against any an intentional loosening due for example to service vibration. Torque tools can be used to apply screwing torques defined beforehand. Locking wrenches can also be added to prohibit any loosening rotation. A locking wrench is a part which, in its most general form, contacts the stud so as to block it once it has been placed. In a known form, the studs include polygonal, for example hexagonal, cross-section portions, and the wrenches are small plate-shaped comprising a pair of fingerprints with a cross-section which is also hexagonal, that are inserted on a pair of consecutive studs before the tightening nuts are installed. The studs retain both ends of the wrench thus preventing it to rotate, and the wrench retains each of the studs (according to document U.S. Pat. No. 6,641,326 B2).

A first drawback of this design is that the studs should have determined and if possible uniform gaps, otherwise a great number of widths of wrenches would be necessary. But, such uniform gaps are impossible if part of the securing ring has to be reserved to other pieces of equipment such as fluid tubes, or probes. Another drawback which is often encountered is that it is problematic to apply the tightening torque without the risk of damaging some parts of the assembly as the wrench or the flange. Another risk is that, if the screwing of the studs in the captive nuts is excessive, the nuts could also be damaged, if for example a part with a larger diameter of the stud collides with them.

The subject matter of the invention is an assembly of the kind described until now, in which an individual locking wrench is added, that is associated with a single stud, which enables a sufficient tightening torque to be applied to ensure the assembly rigidity and which is likely neither to be damaged nor to damage adjacent parts during this tightening, and which is also able to avoid an excessive screwing of the stud inadvertently.

Under a general form, the invention consists of an assembly comprising a securing stud, two superimposed flanges through which the stud passes, a nut depending on one of the flanges and in which one end of the stud is screwed, a tightening nut screwed to an opposite end of the stud, and a locking wrench tightened between the tightening nut and another of the flanges, the locking wrench comprising a main body provided with a bore, the bore having a non-circular cross-section and being occupied for a corresponding-cross-section portion of the stud, characterised in that the main body is extended through a portion extending beyond a border of said other flange in a direction perpendicular to the stud and then by a portion projecting from the main body towards the stud and extending in front of said border.

The projecting portion allows a limited angle rotation of the stud once the wrench has been installed on the same, by abutting onto the flange. An excessive stud screwing is thus avoided which could damage the captive nut and would result in fully disassembling the structure to thereby replace this nut. The specified tightening torque can however be applied to the stud, the strains being mainly located in the locking wrench and in the parts of the flange and of the stud adjoining thereto, these parts being dimensioned to be resistant. Adjusting the locking wrench on the stud is finally easy.

Particularly preferentially, the projecting portion of the main body comprises a pair of separated journals on said other flange, in order to ensure from the beginning the position of the locking wrench and its allowed angular clearance.

The journals are advantageously designed not to cause any damage against the flange; therefore, they can comprise rounded contours.

The invention will now be described under its different aspects, characteristics and advantages in connection with the figures, which represent an embodiment thereof:

Figure 1:
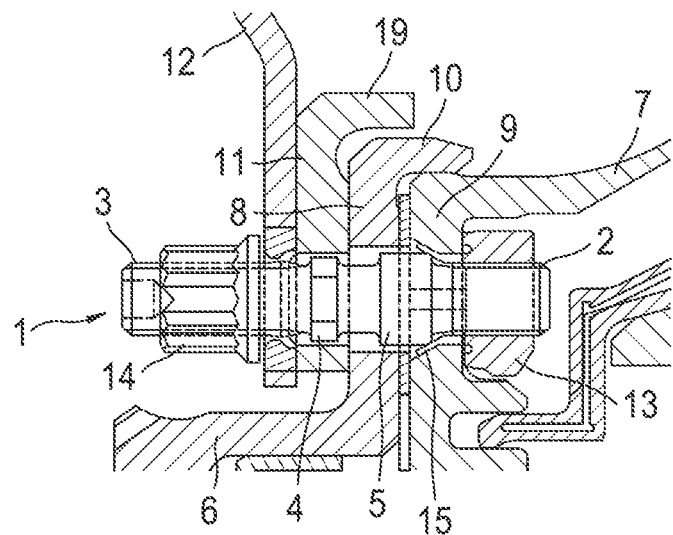
FIG. 1 represents the assembly in a cross-section view.
Figure 2:
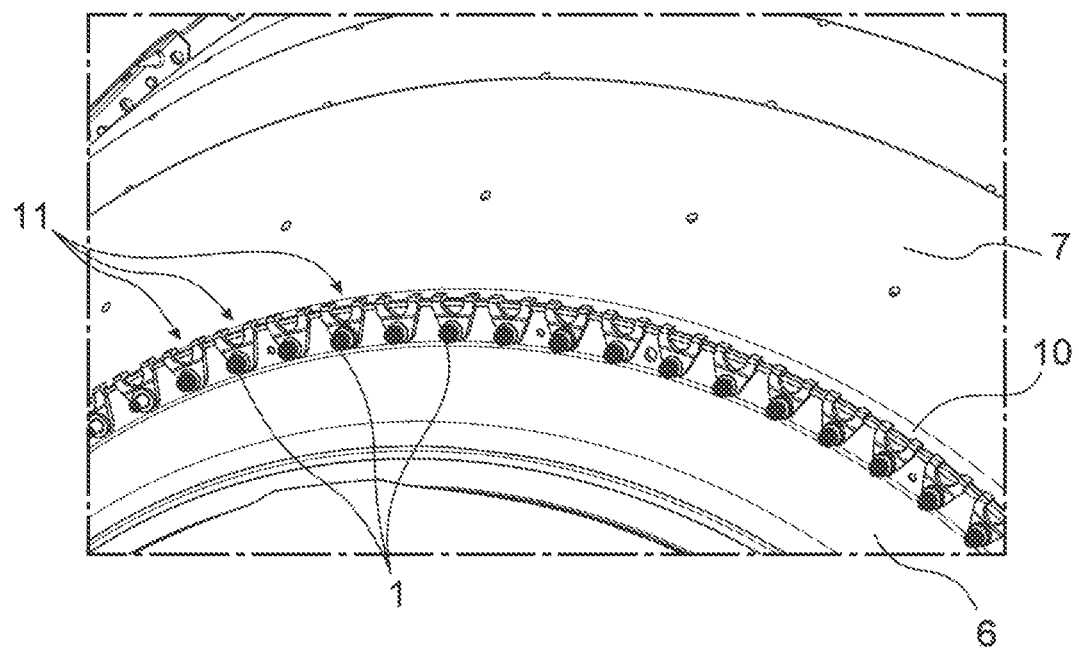
FIG. 2 represents the full device, comprising a great number of these assemblies, in a perspective view.
Figure 4:
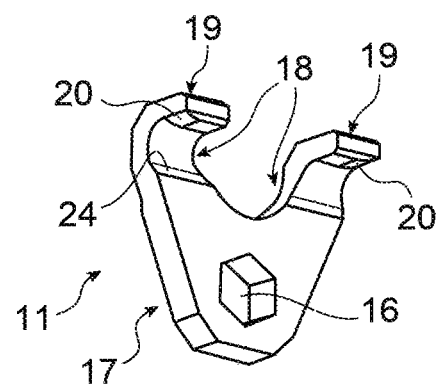
FIGS. 4 and 5 represent the locking wrench in a perspective view.
Figure 5:
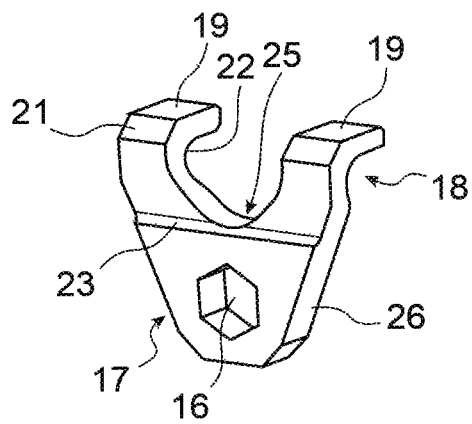
Figure 6:
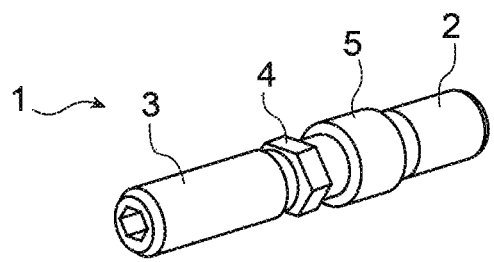
FIG. 6 represents the isolated stud.

The assembly of FIG. 1 comprises a stud 1 both opposite ends 2 and 3 of which are threaded, and the rod of which comprises, between the ends 2 and 3, a hexagonal cross-section median part (hexagonal part 4), and a widened part 5. The stud 1 is used to assembled two cases 6 and 7 which each comprise a circular and planar flange 8 or 9, and for this, it penetrates aligned bores of the flanges 8 and 9 and holds them superimposed with each other. The flange 8 of one of the cases 6 comprises a cylindrical centring border 10 bearing against the other case 7. The assembly also comprises a locking wrench 11 which is an essential aspect of the invention, possibly a support 12 of a piece of equipment which is not represented—as is very often encountered in aeronautics—and two nuts 13 and 14, the nut 13 being a captive nut crimped in the case 7 by a conical skirt 15 opening to the other case 6 and the nut 14 being a tightening nut. The first end 2 is screwed in the captive nut 13, the widened portion 5 is close to the skirt 15, the hexagonal part 4 is located in a fingerprint 16 (represented in FIGS. 4 and 5) of the locking wrench 11, and the tightening nut 14 is engaged by screwing on the opposite end 3; the flanges 9, 8, the locking wrench 11 and the support 12 are tightened in this order from the captive nut 13 to the tightening, nut 14.

In the mounting state, the anterior ridge of the widened section 5 is close to the skirt 15 and is likely to rub against it and to damage it, thus with the entire captive nut 13, if the stud 1 is excessively screwed. The locking wrench 11 obviates this situation.

Figure 3:
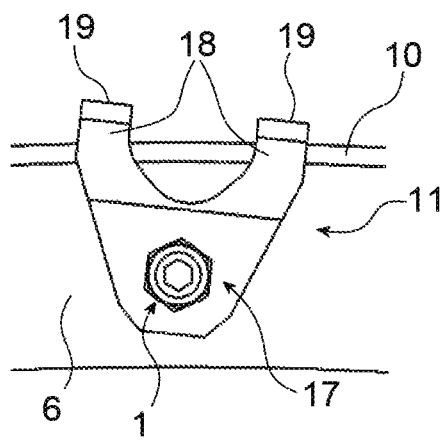
FIG. 3 represents in more detail the journal of the locking wrench on the case.

It is represented in FIGS. 2, 3, 4 and 5. It comprises a main body 17 having a thick small plate-shape in which the fingerprint 16 is dug. The fingerprint 16 has a hexagonal cross-section so as to be able to accommodate the hexagonal part 4 with some play, but preventing them from being mutually rotated. The main body 17 also comprises two separated wings 18, which are an extension thereof projecting next to each other and in a same direction, included in the main extension plane of the main body 17; this direction is, in a mounting position, the external radial direction, such that the wings 18 project from the flange 8 of the case 6 adjacent to the locking wrench 11 and from the planar face of the border 10 it terminates. The end of the wings 18 is curved in a border 19 which is exactly above the peripheral face of the border 10 close enough to it in an assembly starting state. In the definitive assembly state, the position of FIG. 3 is observed, where the locking wrench 11 has slightly flipped and one of the borders 19 (at the right of this FIG. 3) is bearing against the border 10 of the case 6. The borders 19 are shaped with a rounded journal 20 which avoids a contact on too small an area and excessive stress concentrations.

The assembly mode is the following one. The flanges 8 and 9 are superimposed and their bores are aligned, each of the studs 1 is introduced through the end 2 in the bore of the flange 8 and then that of the flange 9 and the end 2 is screwed in the captive nut 13. When the widened part 5 reaches the skirt 15, the screwing is immediately interrupted and the stud 1 is on the contrary slightly unscrewed by a specified quantity, for example an eighth of a turn. The locking wrench 11 is introduced, and the stud 1 is then re-screwed and tightened at the specified torque by setting a torque tool, the locking wrench 11 flipping until one of the rounded journals 20 touches the border 10 of the flange 8 and that the state of FIG. 3 is achieved. The re-screwing movement is insufficient for the ridge of the widened section 5 to touch again the skirt 15. No excessive stress, no damage is thus caused to the captive nut 13. The support 12 can thereby be installed when foreseen, and the tightening nut 14 be screwed in turn. In case of assembly loosening, the rotation of the stud 1 is limited to the small angle which bears the other journal 20 against the border 10.

A great advantage of the locking wrench 11 in accordance with the invention is that it is associated with a single stud 1 and that it can be easily installed without unexpected events. Its resistance is sufficient for a moderate mass. Some design details are noticed, making it possible to optimise the compromise between both these requirements: a chamfer 21 set on the external faces for connecting the wings 18 and the borders 19, and a rounded part 22 at the connection with their internal faces; other chamfers 23 and 24 set on both faces of the main body 17 at its connection with the wings 18, which are less thick; a concavity 25 with a constant radials of curvature provided in the middle of the external radial edge of the main body 17, in the centre of this edge and between the wings 18; a generally triangular shape of the main body 17, limited by two lateral faces 26 extending away from each other to the wings 18; and generally the removal of too acute connection angles, replaced by chamfers as well.

The invention claimed is:

1. An assembly comprising:
a securing stud,
two superimposed flanges through which the stud passes,
a nut depending on one of the flanges and wherein one end of the securing stud is screwed,
a tightening nut screwed to an opposite end of the securing stud, and
a locking wrench tightened between the tightening nut and another of the flanges, the locking wrench comprising a main body provided with a bore, the bore having a non-circular cross-section and being occupied for a corresponding-cross-section portion of the stud,
wherein the main body is extended through a first portion extending beyond a border of said other flange in a direction perpendicular to the stud and then by a second portion projecting from the main body towards the stud and extending in front of said border, and
wherein said first portion is thinner than the main body, and is connected to the main body by a chamfer.

2. The assembly according to claim 1, wherein the flanges belong to turbine cases assembled to each other by said flanges.

3. The assembly according to claim 1, wherein the second portion projecting from the main body comprises a pair of separated journals on said other flange.

4. The assembly according to claim 3, wherein the journals comprise rounded contours directed to said other case.

5. The assembly according to claim 3, wherein the first portion which is an extension of the main body consists of two separated wings, each bearing one of the journals.

* * * * *

UNITED STATES PATENT AND TRADEMARK OFFICE
CERTIFICATE OF CORRECTION

PATENT NO. : 10,900,382 B2
APPLICATION NO. : 15/745788
DATED : January 26, 2021
INVENTOR(S) : Gendraud et al.

Page 1 of 1

It is certified that error appears in the above-identified patent and that said Letters Patent is hereby corrected as shown below:

In the Specification

In Column 4, Line 1, delete "radials" and insert -- radius --, therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*